United States Patent
Harsham et al.

(10) Patent No.: US 11,651,222 B2
(45) Date of Patent: May 16, 2023

(54) SYSTEM AND METHOD FOR USING HUMAN RELATIONSHIP STRUCTURES FOR EMAIL CLASSIFICATION

(71) Applicant: Mitsubishi Electric Research Laboratories, Inc., Cambridge, MA (US)

(72) Inventors: Bret Harsham, Newton, MA (US); Chiori Hori, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 554 days.

(21) Appl. No.: 16/839,129

(22) Filed: Apr. 3, 2020

(65) Prior Publication Data

US 2021/0312395 A1    Oct. 7, 2021

(51) Int. Cl.
| | | |
|---|---|---|
| *G06Q 10/10* | (2023.01) | |
| *G06N 3/04* | (2023.01) | |
| *H04L 12/58* | (2006.01) | |
| *G06Q 10/107* | (2023.01) | |
| *H04W 4/90* | (2018.01) | |

(Continued)

(52) U.S. Cl.
CPC ......... *G06Q 10/107* (2013.01); *G06F 18/214* (2023.01); *G06F 18/22* (2023.01); *G06N 3/044* (2023.01); *G06N 3/08* (2013.01); *H04L 51/21* (2022.05); *H04L 51/212* (2022.05); *H04L 51/216* (2022.05); *H04L 51/42* (2022.05); *H04W 4/90* (2018.02)

(58) Field of Classification Search
CPC ............ G06Q 10/00–107; H04L 41/00; H04L 41/06–0604; H04L 41/0627; H04L 43/00–02; H04L 43/028; H04L 43/04–062; H04L 43/08; H04L 51/00; H04L 51/02; H04L 51/21–214; H04L 51/216; H04L 51/234; H04L 51/42
See application file for complete search history.

(56) References Cited

U.S. PATENT DOCUMENTS

| | | | |
|---|---|---|---|
| 7,359,676 B2 | 4/2008 | Hrastar | |
| 9,177,293 B1 * | 11/2015 | Gagnon | ................ H04L 51/212 |

(Continued)

*Primary Examiner* — Boris D Grijalva Lobos
(74) *Attorney, Agent, or Firm* — Gennadiy Vinokur; Hironori Tsukamoto

(57) ABSTRACT

Systems and methods for a computer system for detecting anomalies in incoming communication from a sender to a receiver. Accepting a relationship structure defining a trained association model between the sender and the receiver, and the incoming communication. Accessing neural networks trained to detect anomalies in the incoming communication and classify the anomalies by type, subject to correspondence between content of the incoming communication and the trained association model between the sender and the receiver. Compute an updated association model, based on sender and the receivers organizational indications using the content of the incoming communication. Execute the neural networks by submitting the incoming communication and the updated association model to produce a result of anomaly detection and anomaly classification type. Execute a single sequence of defensive actions to deliver the incoming communication to the receiver, when the single sequence of defensive actions is above a predetermined delivering threshold.

18 Claims, 7 Drawing Sheets

(51) Int. Cl.
*G06N 3/08* (2023.01)
*H04L 51/42* (2022.01)
*H04L 51/216* (2022.01)
*H04L 51/212* (2022.01)
*H04L 51/21* (2022.01)
*G06F 18/22* (2023.01)
*G06F 18/214* (2023.01)
*G06N 3/044* (2023.01)

(56) References Cited

U.S. PATENT DOCUMENTS

| | | |
|---|---|---|
| 11,258,811 B2 * | 2/2022 | Hall .................. G06F 21/564 |
| 2018/0097836 A1 | 4/2018 | Stolarz et al. |
| 2019/0199745 A1 | 6/2019 | Jakobsson et al. |
| 2019/0260780 A1 | 8/2019 | Dunn et al. |
| 2020/0204572 A1 * | 6/2020 | Jeyakumar ............ H04L 63/123 |

* cited by examiner

*(Computer Device)*

*(Mobile Computer Device)*

SYSTEM AND METHOD FOR USING HUMAN RELATIONSHIP STRUCTURES FOR EMAIL CLASSIFICATION

FIELD

The present disclosure generally relates to machine learning, and more particularly, to training deep learning algorithms as email relationship based communication classifiers between a sender and a receiver, and using them to detect anomalies such as hostile requests for personal and organizational data, in order to take defensive actions such as protecting the receiver and/or alerting security personnel.

BACKGROUND

With the maturing use of the Internet, deceptive persons have found an opportunity to harm others, to steal and to otherwise abuse communication channels of the Internet through deception. Deception can be understood as an intentional attempt to create a false belief in another entity, which belief the communicator knows to be untrue, wherein such aspects of deception can have many different means for implementation. For example, deception can be conducted by providing false information (e.g., email scam, phishing etc.) or falsifying the authorship, gender or age of the author of text content (e.g., impersonation). The negative impact of deceptive activities on the Internet can have impact on both the corporate arena as well as individuals, wherein employees or individual may experience economic, emotional and psychological effects.

Conventional email systems have attempted to prevent e-commerce scams, wherein some companies have implemented preventive deceptive software applications to prevent attacks from deceptive acts, for example, the Federal Trade Commission implemented a phishing prevention guide for their employees. Although these guides offer information for users to detect phishing attempts, they are often ignored by email receivers. For many email phishing scams, in order to get a user's personal information such as name, address, phone number, password, and social security number, the emails sent by these deceptive actors typically direct the receiver to a deceptive website that has been established only to collect a user's personal information, so that it may be used later for identity theft. Due to the billions of dollars lost because of phishing, there is a substantial need for anti-phishing technologies.

Many companies and e-commerce companies have tried to alert consumers and customers to report such scams or phishing emails. However, even despite such awareness attempts to stop these scams and phishing emails, little has been done to stop these deceptive actors. Thus, there is a need to develop algorithms and software tools to detect deception-based Internet schemes and phishing attempts. Although many entities have begun to develop anti-phishing tools, i.e. Google, Microsoft, and McAfee, such attempts to solve these problems have failed to address these phishing emails, and like emails.

For example, conventional email systems categorize emails as spam/junk, but these conventional email systems still have problems classifying incoming emails that appear to be from known parties. Systems for detecting spear phishing attacks tend to use features related to embedded URLs (age of the URL, linguistic features contained in the URL, etc.) for detection, but this is not fully effective.

Accordingly, there is need for developing systems and methods that can improve email classification for incoming communication (emails) to identify and warn recipients of "spear phishing emails", such as hostile requests for data (personal & corporate) and network actions.

SUMMARY

The present disclosure generally relates to machine learning, and more particularly, to training deep learning algorithms as email relationship based communication classifiers between a sender and a receiver, and using them to detect anomalies to prevent receivers from receiving "phishing emails", such as hostile requests for personal and organizational data and network actions.

Some embodiments of the present disclosure include systems and methods for detecting anomaly detection in incoming electronic communication from a sender to a receiver. Wherein a human relationship structure can be used to define an association model, that is, multiple types of indications of associations between persons and entities, where each indication can correlate with a connection between the sender and the receiver, specific to the human relationship structure between the sender and the receiver. Wherein if no indication of associations could be detected, or if the detected associations do not match the content of the email, then most likely the incoming electronic communication, i.e. email was intended to be deceptive. In order to detect the correlation between these multiple types of indications of association and the content of the electronic communication, a neural network is trained to detect anomalies, i.e. deception, of an incoming electronic communication, subject to correspondence between content of the incoming electronic communication and a the indications of association between the sender and the receiver. Upon the neural network being trained, the neural network can be executed by submitting as inputs in to the neural network, the received incoming electronic communication and the association model, to produce a result of anomaly detection, i.e. confirmation of deception which is an anomaly that is a true positive, or no anomaly detection which is an anomaly that is a false positive. Additionally, if separate types of anomalies are known, the same or a separate neural network may be trained to identify the type of anomaly. When an anomaly is detected, a sequence of defensive actions that are associated with the type of anomaly are taken that may include not delivering the incoming electronic communication is delivered to receiver, sanitizing the electronic communication, and/or notifying one or more persons If multiple types of anomalies are detected, the associated sequences of defensive actions may be combined, either heuristically or using a learned model.

However, in order to better understand the systems and methods of the present disclosure some nomenclature needs to be defined. For example, indications of associations can be understood as particular types of connections between or probabilities of particular types of connections between persons or entities. For instance, two employees of the same organization are connected by their membership in the organization. Two employees of an organization that both work in the organizational unit of an organization have another connection, which is their membership in the same organizational unit. If those two employees have a supervisory/supervised relationship, then they have an additional connection representing the supervision relationship. Furthermore, entities representing generalized types may be included, for instance representing common kinds of business units. An employee who works in a business department that does accounting work could have a connection to a generalized entity that represents accounting business practices. An association model is the set of indications of association between two particular persons, computed from all the information known about the persons including their membership in various organizations, their past emails, etc. A human relationship structure is a graph structure that includes entities including persons, organizations such as businesses and business sub-units, and connections between the entities that include indications of membership, business association, non-business association, and familial connection. Human relationship structures exist in multiple forms including organizational charts and organizational databases. A human relationship structure may be constructed or extended by extracting connections and membership links from electronic communications, either from text or metadata that expressly states the connections, such as headers and signature blocks of email, or from text that implies the probability of a connection. A human relationship structure may include only connections where the connection is known to exist, or may include connections that have an associated probability of existence. A human relationship structure may additionally include information about connections that existed in the past but do not currently exist. The term anomaly can be understood as something that deviates from what is standard, normal, or expected. Such that the term anomaly according to the present disclosure can be associated with an incoming communication from a sender to a receiver that is based on deception. Deception can be understood as an intended attempt by the sender to create in the receiver, a belief which the communicator, i.e. sender, considers to be untrue. Basically, the sender purposely intends manipulation in the incoming communication to cause a false belief or false conclusion by the receiver, wherein the sender tries to get the receiver of the incoming communication to do some act based upon the false belief, such as providing security credentials, confidential financial information, or personal information, for the sender's gain.

At least one realization of the present disclosure includes using a human relationship structure to define an association model between the sender and the receiver specific to a human relationship structure including the sender and the receiver. The indications of associations represented by the model can be used to identify connections between the sender and the receiver, to either determine that the incoming communication is an anomaly, i.e. confirmation of deception in the incoming communication. For example, if no anomaly is detected then the identified indications of associations substantiate that the sender and receiver have enough connections and most likely know each other or have some pre-established communication or relationship, to verify the incoming communication as not having hostile requests (i.e. hostile intent or hostile attack), of which, the incoming communication can be sent to the receiver. However, if an anomaly is detected, i.e. there is a confirmation of possible deception, where not enough connections or the wrong types of connections were detected between the sender and the receiver, then the incoming communication most likely contains hostile requests. After detection of an anomaly, the anomaly can be compared to other anomalies stored in a database to determine if the anomaly is a true positive or a false positive. Upon confirmation of an anomaly, i.e. confirmation of deception in the incoming communication, a set of defensive actions are executed. When various types of anomalies are identified, the type of anomaly in the received electronic communication can be classified and different sets of defensive actions can be associated with the various types of anomalies. Many kinds of defensive actions are possible, the simplest being that the incoming communication is not delivered to the receiver.

An example of an hostile intent can be email phishing, which is usually a communication by a sender written as if the sender knows the receiver, i.e. communication characterized as being passive or subtle. When the receiver of such hostile intent, views the received communication, she often fails to detect or comprehend determining the incoming communication is hostile. Another definition of email phishing can be a type of social engineering attack often used to steal users, i.e. receivers, personal financial or confidential information, for the stealers gain. Examples of data stolen from receivers of incoming communication can be log-in credentials, credit card numbers, social security numbers, etc. Phishing often occurs when an attacker, i.e. sender, is masquerading as a trusted entity, so as to dupe a victim, i.e. receiver, into opening an incoming communication, i.e. an email, instant message, or text message. Phishing is a cyber attack that uses disguised email as a weapon. The goal is to trick the email recipient into believing that the message is something they want or need, i.e. a request from their bank information, or the message could be disguised as a note from someone within their organization or company, and the cyber attacker tries to get the receiver to click a link or download an attachment.

In contrast, a hostile attack is crafted in bolder language when compared to email phishing, for example, the hostile attack email could make an action statement requiring that the receiver take some action, i.e. a denial-of-service attack, which is presented in such a manner that the receiver is likely to detect that the incoming communication is a hostile attack, if for no other reason, by identifying the sender's contact information. However, with most incoming communication, the receiver has the challenging and difficult task of trying to determine if the incoming communication is trying to deceive or defraud deception the receiver. At least one reason detection of a hostile request, i.e. hostile intent/hostile attacks, can be very difficult for the receivers to detect is because deception can be presented in many different forms and many different ways. In order to address these serious problems of detecting hostile intent/hostile attacks associated with incoming communications, the present disclosure during experimentation had several realizations in addressing these problems.

At least one realization of the present disclosure was realizing an importance of defining indications of association associated with the human relationship structure such as at an identity-level between the sender and the receiver. The associations at the identity-level is one way that indications can correlate connections between the sender and the receiver which may correlate to the content of electronic communications between the sender and the receiver. For example, some indications of association at the identity-level between the sender and the receiver, can be identified with roles within an organization, i.e. working hierarchy, such as job titles, job descriptions disclosed in the incoming communication by the sender. These identities of the sender may be used to identify or help detect indications of association between the sender and the receiver.

Another realization of the present disclosure is defining indications of association associated with the human relationship structure at the message-level between the sender and the receiver. The indications of association at the message-level is one way that indications can correlate connections between the sender and the receiver which may correlate to the content of electronic communications between the sender and the receiver. For example, some indications of association at the message-level between the sender and the receiver, can be associated with key words within an organization, such as: (a) same technology terms, concepts, phrases or references in the organization; (b) key words or terms occurring in prior email conversations between the sender and the receiver, either within the organization or outside of the organization; (c) family member associations via last names, terms or phrased used between the sender and the receiver, where the family member status could be verified via other sources such as an employee profile database of the organization.

Another realization of the present disclosure is that different kinds of attacks have different severities and may require different mitigation, and that it is therefore desirable to be able to classify and detect different categories of attacks in order to be able to associate defensive actions with those types. For instance, it may be desirable to take different defensive actions against a hostile attack than against a hostile intent. This can be done by classifying these as different types of anomalies and associating different sequences of defensive actions with each type.

What was discovered from experimentation is that most peoples' ability to detect deception is not good, and in fact, even bad. For these reasons, by non-limiting example, some of the embodiments of the present disclosure are configured to institute techniques for detecting deception, before the receiver reads the incoming communication. Some detection deception approaches of the present disclosure use a neural network(s) such as mathematical models, i.e. deep learning algorithms, that are based on indications of association that are correlated to the content of electronic communications between the sender and the receiver.

Some embodiments of the present disclosure improve email classification by using a representation of human relationship structure in a deep learning network classification task. The human relationship structure in the form of a graph, can include indications of associations between the sender and the receiver based on connections between the sender and the receiver found in one or many sources including using: (a) an organizational database that includes a working hierarchy of employees within the organization, such that job titles, organization name(s) are used as text content; (b) an organization technology database, wherein each technology associated with the organization includes a set of predetermined technology terms used as text content; (c) an employee database for each employee of the organization that includes each employee profile including work history such as past organizational positions held, hobbies, family names, family contact information, which all may be used as terms as text content; (d) an employee email database for each employee of the organization, includes previous conversations between employees of the organization and non-employees outside of the organization; (e) an inferred relationship database determined based on a prior communications, from and/or to members of the organization, and/or obtained from analysis of one or more of the employee email database, employee database, organization technology database, organizational database, etc.

For example, by encoding known or inferred connections between sender and the receiver in an email exchange, some embodiments of the present disclosure improve classification of the incoming communication. For example, the incoming email can be detected as a non-hostile email or a anomaly that is false positive, or that enough connections were detected to establish a relationship between the sender and the receiver. Other forms of asynchronous communication other than email, can include, by non-limiting example, Instagram, Twitter, etc, may also be classified.

Some embodiments of the present disclosure upon receiving the incoming communication indexes one or more of the incoming communications of the organization, such as per email, by non-limiting example. The indexed data can be stored in one or more databases, and accessed immediately or at some later time. Or if the computer system operates in real-time, the incoming communication can be indexed, stored, and text can be extracted from the data. Upon indexing, extracting text and storing the data in one or more database, the computer system can process the data to each specific classified algorithm, i.e. filter, such that each classified algorithm scores the data for each incoming communication for accuracy in comparison to how each classified algorithm was trained. The process by which each classified algorithm is trained to detect anomalies or no anomalies, is based on creating training datasets for textual data corresponding to detecting the specific anomaly classification, and used to train one or more deep learning algorithm using one or more training datasets. Then, electronic communications related to an organization is extracted, and applied to the one or more deep learning algorithm to the electronic communications to identify and report the detected anomaly or no anomaly detection. Further, if an anomaly is detected, then further testing of the anomaly can be done against the stored anomaly database so that a determination is made if the detected anomaly is a false positive or a true positive. If a true positive is detected, i.e. an anomaly is detected, then the incoming communication is most likely including a hostile intent or a hostile attack, wherein the true positive anomaly may be saved in a true positive database, so that the one or more deep learning algorithm may be re-trained either immediately or later. Furthermore, defensive actions such as sanitizing or deleting the email, attaching warnings to the email, and/or notifying a security administrator may be taken. If a false positive is detected, i.e. no anomaly is detected, there were determined enough connections between the sender and the receiver, and/or enough similarity with a negative example database and/or a false positive database such that the incoming communication most likely does not include a hostile intent or a hostile attack, then the false positive anomaly may be saved in a false positive database, and the one or more deep learning algorithm may be re-trained. Also, upon determination of no anomaly or a false positive anomaly, then the incoming communication, i.e. email, can be processed normally, for instance, delivered to the receiver.

During experimentation neural network(s) were trained to detect anomalies, i.e. indications of association correlated to the content of electronic communications between the sender and the receiver, such that a mismatch between the indications of association and the content of the electronic communications was detectable. In particular, in building these classification models, machine learning and data mining methods were experimentally tested and found to be effective. Machine learning methods like discriminant analysis, logistic regression, decision trees, and neural networks, as noted above, were experimentally tested and discovered to be applicable to deception detection. Comparison of the various experimented machine learning techniques for deception detection indicated that neural network methods achieved the most consistent and robust performance.

Learned from experimentation is that indication approaches with neural networks are effective for deception detection, such that if no indications of association, or indications of the wrong associations, could be substantiated, then most likely proved deception, this later proved to be even more evident as more experimental approaches were tested. What was realized from this experimentation is that the data sets used to train and validate the correlations between the indications of association and the content of the electronic communications needed to be robust enough in order to reach a qualified result regarding detecting anomalies, i.e. confirmation of deception. A qualified result can be understood as meeting a standard of consistent results in determining hostile intent, i.e. a positive result of anomaly detection, or not hostile intent, i.e. a negative result of anomaly detection, in the incoming communication, which the qualification can be based on a predetermined quality or level of consistent results, via a predetermined threshold. For example, what was discovered from experimentation was that often one particular data set for electronic communications and indications of association was not enough data to achieve a level of a standard of consistent results per the standard of the present disclosure. However, what was realized is that using multiple data sets of electronic communications and indications of association proved to provide consistent effective results in detecting deception as per an acceptable predetermined threshold. As noted above, there is no one data set for electronic communications that can be used to detect hostile intent, the research field of detecting hostile requests, i.e. hostile intent/hostile attacks, for stopping deceitful actors is very new, where little development has been conducted within today's societies of detection of hostile request technological development arenas. Recently the US Department of Homeland Security, has given this technology area a reference name "Future Attribute Screening Technology", which is now a government entity beginning research in this technology area.

Today's scammers with hostile intent are getting more and more sophisticated in using many different deceitful approaches, which often changes quickly, and requires multiple data sets of electronic communications in order to detect deception. Thus, there is a need by individuals and organizations around the world to use the embodiments of the present disclosure to detect deception and hostile intent from scammers.

Some embodiments of the present disclosure utilize statistical systems/methods combining both statistical modeling and indications of association correlated to the content of electronic communications between the sender and the receiver. In particular, according to embodiments of the present disclosure, some steps used by a computer system can include, by non-limiting example: 1) identifying multiple types of indications of association correlated to the content of electronic communications between the sender and the receiver for detecting anomalies, i.e. deception in incoming communication; 2) computing and representing these identified multiple types of indications of association from a human relationship structure stored in a database; 3) ranking the identified multiple types of indications of association or lack thereof, on a scale ranging from what is most pertinent/important to least pertinent/important; 4) statistical modeling of the identified multiple types of indications of association; 5) designing probability tests for addressing the problem; 6) testing the designed model(s) using current test data to ensure accuracy and effectiveness of the model; and 7) creating databases of previously identified and confirmed as anomaly detection, i.e. confirmed types of indications of association, along with creating databases of these indications, among other aspects.

The present disclosure addresses and overcomes the problems of conventional email systems by providing systems and methods for detecting anomalies, i.e. detecting deception, in incoming communications via emails using a computer programmed with software that automatically analyzes an incoming communication, i.e. a text message, in digital form for deceptiveness by at least one of statistical analysis of text content to ascertain and evaluate correlations of indications of associations of human relationship structures with the content of electronic text messages, among other aspects.

According to another embodiment of the present disclosure, computer system for detecting anomalies in incoming electronic communication from a sender to a receiver. The system including an input interface configured to accept a human relationship structure defining a trained association model between the sender and the receiver, and the incoming electronic communication. A memory configured to store one or more neural network trained to detect anomalies in the incoming electronic communication. As well as classify the anomalies by type, subject to correspondence between content of the incoming electronic communication and the trained association model between the sender and the receiver, such that each type of detected anomaly is associated with a set of defensive actions. A processor configured to compute an updated association model between the sender and the receiver, based on sender and the receivers organizational indications using the content of the incoming electronic communication. Execute the one or more neural network by submitting to the one or more neural network the incoming electronic communication and the updated association model to produce a result of at least one anomaly detection and anomaly classification type. Then, combining sets of defensive actions associated with the at least one anomaly detection into a single sequence of defensive actions. Combine the identified sets of defensive actions into a single sequence of defensive actions. Execute the single sequence of defensive actions to deliver the incoming electronic communication to the receiver, when the single sequence of defensive actions is above a predetermined delivering threshold.

According to another embodiment of the present disclosure, a method for detecting anomalies in incoming electronic communication from a sender to a receiver. The method including receiving a human relationship structure defining a trained association model between the sender and the receiver, and the incoming electronic communication. Accessing a memory having stored data. The stored data includes one or more neural network trained to detect anomalies in the incoming electronic communication and classify the anomalies by type, subject to correspondence between content of the incoming electronic communication and the trained association model between the sender and the receiver, such that each type of detected anomaly is associated with a set of defensive actions. Computing an updated association model between the sender and the receiver, based on sender and the receivers organizational indications using the content of the incoming electronic communication. Executing the one or more neural network by submitting to the one or more neural network the incoming electronic communication and the updated association model to produce a result of at least one anomaly detection and anomaly classification type. Then, combining sets of defensive actions associated with the at least one anomaly detection into a single sequence of defensive actions. Execute the single sequence of defensive actions to deliver the incoming electronic communication to the receiver, when the single sequence of defensive actions is above a predetermined delivering threshold.

According to another embodiment of the present disclosure, a non-transitory computer readable storage medium embodied thereon a program executable by a processor for performing a method. The method for detecting anomalies in incoming communication from a sender to a receiver. The method including receiving a relationship structure defining a trained association model between the sender and the receiver and the incoming communication. Accessing a memory having stored data, the stored data includes one or more neural network trained to detect anomalies in the incoming communication and classify the anomalies by type, subject to correspondence between content of the incoming communication and the trained association model, such that each type of detected anomaly is associated with a set of defensive actions. Computing an updated association model, based on sender and the receivers organizational indications using the content of the incoming communication. Executing the one or more neural network by submitting to the one or more neural network the incoming communication and the updated association model to produce a result of at least one anomaly detection and anomaly classification type. Then, combining sets of defensive actions associated with the at least one anomaly detection into a single sequence of defensive actions. Execute the single sequence of defensive actions to deliver the incoming communication to the receiver, when the single sequence of defensive actions is above a predetermined delivering threshold.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1A:
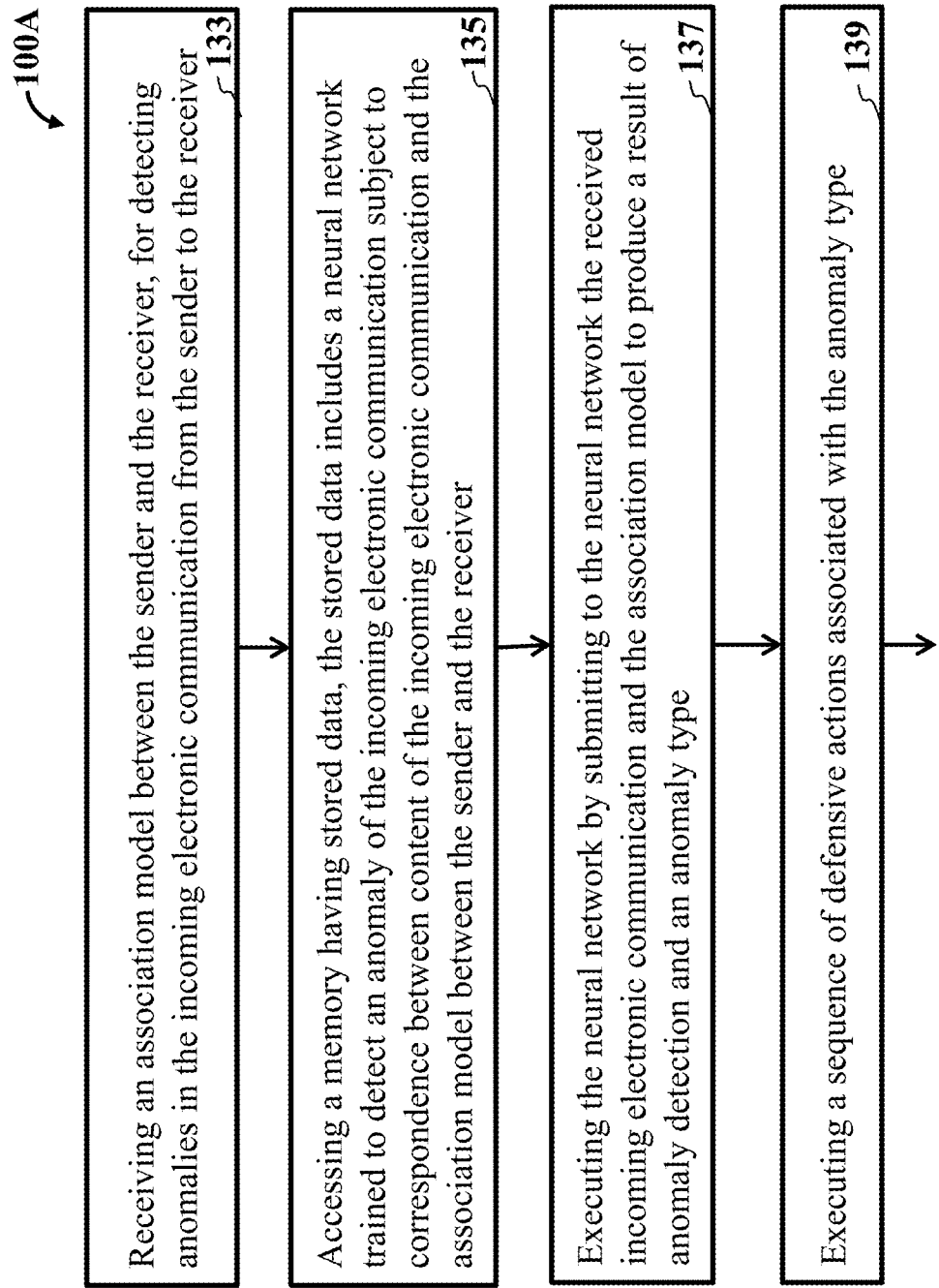
FIG. 1A is a flow diagram illustrating a method, according to embodiments of the present disclosure.

FIG. 1A is a flow diagram illustrating a method, according to embodiments of the present disclosure. The method is for detecting anomalies in incoming electronic communication from a sender to a receiver.

Step 133 of FIG. 1A includes receiving an association model comprising indications of association between the sender and the receiver defining context for an incoming electronic communication.

Step 135 of FIG. 1A includes accessing a memory having stored data, the stored data includes a neural network trained to detect an anomaly of the incoming electronic communication subject to correspondence between content of the incoming electronic communication and the association model between the sender and the receiver.

Step 137 of FIG. 1A includes executing the neural network by submitting to the neural network the received incoming electronic communication and the association model to produce a result of anomaly detection and a type associated with the anomaly.

Step 139 of FIG. 1A includes Executing a sequence of defensive actions associated with the type of the anomaly.

An aspect of the method can be that the received incoming electronic communication is processed into classified text and used with the neural network including deep learning algorithms to detect the anomalies. Wherein the processor is configured to create training datasets for textual data which include both electronic communications and association models between senders and receivers, and to train the deep learning algorithms using the one or more training datasets such that correlation between the content of the electronic communications and the association models is learned. Further, the step of extracting association models from stored representations of human relationship structures connecting sender and receiver is done, wherein the learning algorithms are applied to the combination of an electronic communication with the association model between sender and receiver to identify and report, the detected anomaly. Then, the process is to determine if the detected anomaly is a true positive or a false positive. If the detected anomaly is the true positive indicating a hostile intent, then the electronic communications are saved in a true positive database, as well as used to re-train the deep learning algorithms. However, if the detected anomaly is the false positive indicating the no anomaly detected, then the electronic communications are saved in a false positive database, and used to re-train the deep learning algorithms. Also, upon confirmation of the anomaly being the false positive, the incoming electronic communication processed as normal.

Another aspect of the deep learning algorithms, is that each deep learning algorithm is trained with a different association model. Wherein some different association models can include indications of associations detected at an identity-level, and other association models can include associations detected at a message-level, and other association models can include indications of associations detected at an organization-level. Wherein each deep learning algorithm is associated with specific indications of association such as the identity-level associations. Such that the deep learning algorithm associated with the identity-level associations is trained using previously identified association model data, associated with previous associations at an identity-level between the sender and the receiver. Further, another deep learning algorithm associated with the message-level associations is trained using previously identified association model data, associated with previous associations at a message-level between the sender and the receiver Further, another deep learning algorithm associated with the organization-level associations is trained using previously identified association model data, associated with previous associations at an organization-level between the sender and the receiver.

Contemplated for some embodiments of the present disclosure is that the incoming electronic communication can be indexed. Wherein scoring of each deep learning can be using the indexed data, the indexed data provides accuracy with the deep learning algorithm, since the data includes indications of association between the sender and the receiver and previously stored electronic communications marked as no-anomaly or marked as an anomaly of a specific type. Wherein the scores can be evaluated, and the scores and related data can be stored in a detected anomaly database based upon scores that are above a predetermined anomaly score threshold.

Embodiments of the present disclosure provide unique aspects, by non-limiting example, utilize a deep learning network to improve the ability of the network to predict future conversation based on context. The present disclosure uses human relationship structures, including both familial and organizational structures, as elements in a deep network to improve various email classification tasks, among other aspects. Use cases include detection of hostile ("spam" or "spearphishing") inbound emails.

Other use cases of some embodiments of the present disclosure can include detection of potentially inappropriate language in outgoing email drafts, so that a user may rephrase and improve the email draft. For example, language appropriate between two people who are of approximately equal status in an organization can be different than the language used when the two people are in a supervisor/supervised relationship, and likewise, language appropriate between two people who work closely together differs from language used between people who are from different organizational units. Conventional email systems fail to alert a user writing an outgoing communication of inappropriate language. In the best case while using the conventional email systems, the user puts the message aside for a while before sending and revises the draft, but nevertheless it is common for users to have "sender's remorse" after composing and sending an email with language that is inappropriate for the professional and/or interpersonal relationship(s) between sender and recipient. These conventional email systems are configured for composing emails to provide suggestions related to standard grammar and spelling, which does nothing in addressing a user inputting inappropriate language into the outgoing communication, and regret do so later. In contrast, some embodiments of the present disclosure overcome the faults of the conventional email systems, by identifying emails containing language inappropriate to a relationship of the sender (writer) to receiver (possibly due to the sender writing strong emotion language). These embodiments of the present disclosure identify the inappropriate language, and alert the email sender to review and edit the email before sending.

Figure 1B:
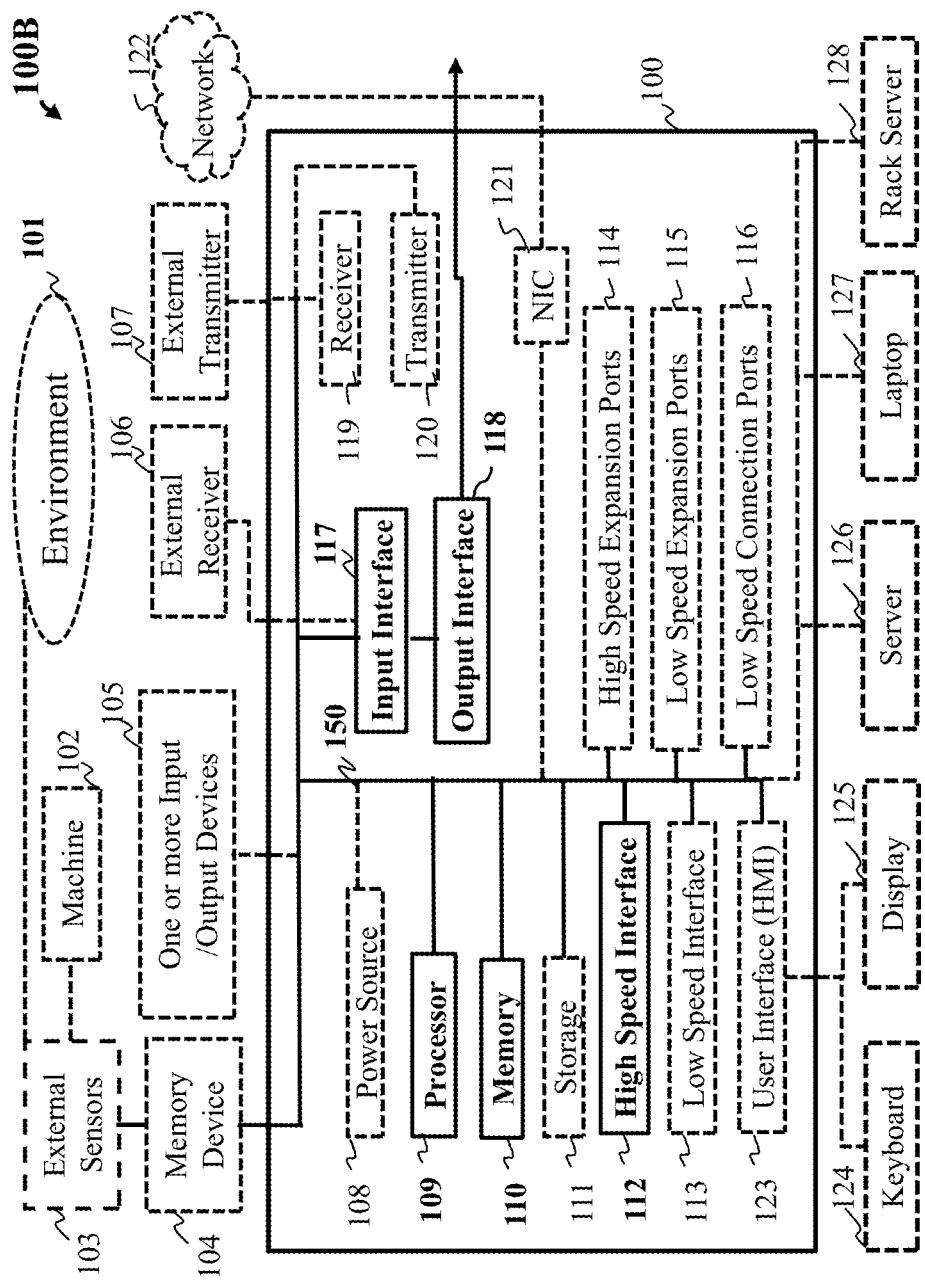
FIG. 1B is a schematic illustrating by non-limiting example of a computing apparatus that can be used with the communication system to implement some methods and systems, according to embodiments of the present disclosure.

FIG. 1B is a schematic illustrating by non-limiting example of a computing apparatus 100B that can be used with the communication system to implement some methods and systems, according to embodiments of the present disclosure. The computing apparatus or device 100B represents various forms of digital computers, such as laptops, desktops, workstations, personal digital assistants, servers, blade servers, mainframes, and other appropriate computers. It is contemplated that components of FIG. 1B can be integrated into FIG. 4, and vice versa, depending upon a specific user application.

The computing device 100B can include a power source 108, a processor 109, a memory 110, a storage device 111, all connected to a bus 150. Further, a high-speed interface 112, a low-speed interface 113, high-speed expansion ports 114 and low speed connection ports 115, can be connected to the bus 150. Also, a low-speed expansion port 116 is in connection with the bus 150. Contemplated are various component configurations that may be mounted on a common motherboard, by non-limiting example, depending upon the specific application. Further still, an input interface 117 can be connected via bus 150 to an external receiver 106 and an output interface 118. A receiver 119 can be connected to an external transmitter 107 and a transmitter 120 via the bus 150. Also connected to the bus 150 can be an external memory 104, external sensors 103, machine(s) 102 and an environment 101. Further, one or more external input/output devices 105 can be connected to the bus 150. A network interface controller (NIC) 121 can be adapted to connect through the bus 150 to a network 122, wherein data or other data, among other things, can be rendered on a third-party display device, third party imaging device, and/or third-party printing device outside of the computer device 100B.

Still referring to FIG. 1B, contemplated is that the memory 110 can store instructions that are executable by the computer device 100B, historical data, and any data that can be utilized by the methods and systems of the present disclosure. The memory 110 can include random access memory (RAM), read only memory (ROM), flash memory, or any other suitable memory systems. The memory 110 can be a volatile memory unit or units, and/or a non-volatile memory unit or units. The memory 110 may also be another form of computer-readable medium, such as a magnetic or optical disk.

A storage device 111 can be adapted to store supplementary data and/or software modules used by the computer device 100B. For example, the storage device 111 can store historical data and other related data as mentioned above regarding the present disclosure. Additionally, or alternatively, the storage device 111 can store historical data similar to data as mentioned above regarding the present disclosure. The storage device 111 can include a hard drive, an optical drive, a thumb-drive, an array of drives, or any combinations thereof. Further, the storage device 111 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 109), perform one or more methods, such as those described above.

The system can be linked through the bus 150 optionally to a display interface or user Interface (HMI) 123 adapted to connect the system to a display device 125 and keyboard 1024, wherein the display device 125 can include a computer monitor, camera, television, projector, or mobile device, among others.

Still referring to FIG. 1B, the computer device 100B can include a user input interface 117 adapted to a printer interface (not shown) can also be connected through bus 150 and adapted to connect to a printing device (not shown), wherein the printing device can include a liquid inkjet printer, solid ink printer, large-scale commercial printer, thermal printer, UV printer, or dye-sublimation printer, among others.

The high-speed interface 112 manages bandwidth-intensive operations for the computing device 100B, while the low-speed interface 113 manages lower bandwidth-intensive operations. Such allocation of functions is an example only. In some implementations, the high-speed interface 112 can be coupled to the memory 110, a user interface (HMI) 123, and to a keyboard 124 and display 125 (e.g., through a graphics processor or accelerator), and to the high-speed expansion ports 114, which may accept various expansion cards (not shown) via bus 150. In the implementation, the low-speed interface 113 is coupled to the storage device 111 and the low-speed expansion port 115, via bus 150. The low-speed expansion port 115, which may include various communication ports (e.g., USB, Bluetooth, Ethernet, wireless Ethernet) may be coupled to one or more input/output devices 105, and other devices a keyboard 124, a pointing device (not shown), a scanner (not shown), or a networking device such as a switch or router, e.g., through a network adapter.

Still referring to FIG. 1B, the computing device 100B may be implemented in a number of different forms, as shown in the figure. For example, it may be implemented as a standard server 126, or multiple times in a group of such servers. In addition, it may be implemented in a personal computer such as a laptop computer 127. It may also be implemented as part of a rack server system 128. Alternatively, components from the computing device 100B may be combined with other components in a mobile device (not shown), such as a mobile computing device FIG. 4. Each of such devices may contain one or more of the computing devices of FIG. 1B and the mobile computing device of FIG. 4, and an entire system may be made up of multiple computing devices communicating with each other.

Figure 1C:
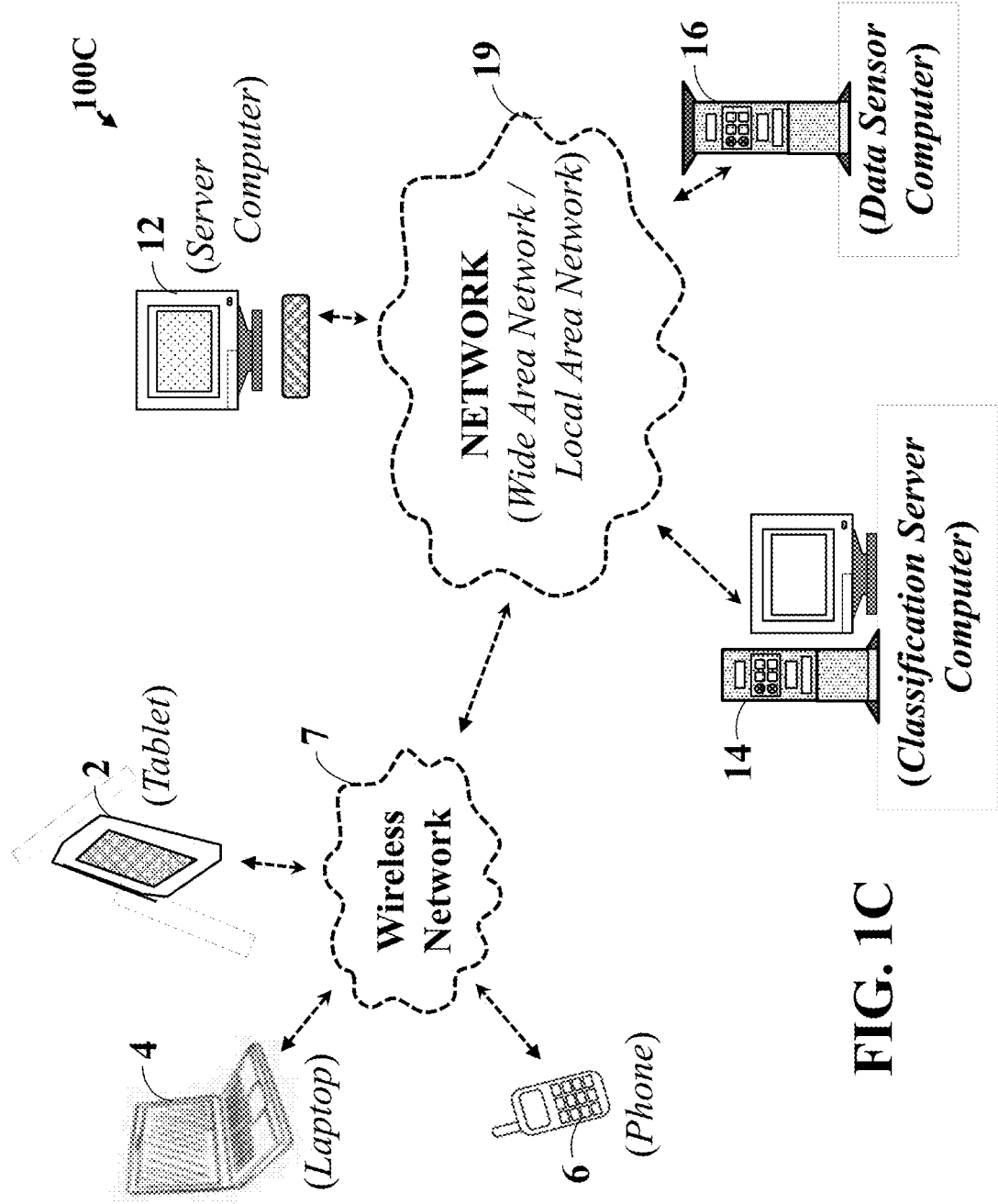
FIG. 1C is a schematic illustrating some components of an embodiment of a computer system design plan, according to some embodiments of the present disclosure.

FIG. 1C is a schematic illustrating some components of an embodiment of a computer system design plan, according to some embodiments of the present disclosure. The computer system design plan 100D includes a network (i.e. a wide area network (WANs)/local area networks (LANs)) 19, a server computer 12, a classification server computer 14 and a data sensor computer 16 that can be in communication with the network 19.

A wireless network 7 can be in communication with the network 19 and include client related devices (i.e. a client tablet 2, a client laptop 4 a client phone/computer 6) which is in communication with the wireless network 7 and/or the network 19. Depending upon the specific application or use of the client, the client devices 2, 4,6 can be associated with a corporate entity or some other type of organization. Like well-known client computer configurations, the client devices can include some or all of the components of FIG. 1B and FIG. 4, including other components such as applications related to the client, audio/video components and related security protective devices, i.e. firewalls, cyber security software, etc.

Still referring to FIG. 1C, the network 19 can be configured with other network computers and hardware systems depending upon the application and user requirements, including being in communication with the classification server computer 14, data sensor computer 16, server computer 12. Also, the network can include some or all of the features described in FIG. 1B and FIG. 4 relating to network components, depending upon the specific application. For example, the sensor computer 16 can execute applications, including neural networks, machine learning engine, classifier computer 14, can include sensor and classifier applications if needed per user component designs. Contemplated is that computer configurations can vary depending upon the user specifications and applications, such that components of FIG. 1B and FIG. 4, can be combined into a single or multiple like devices, in order to support the embodiments of the present disclosure.

Figure 2:
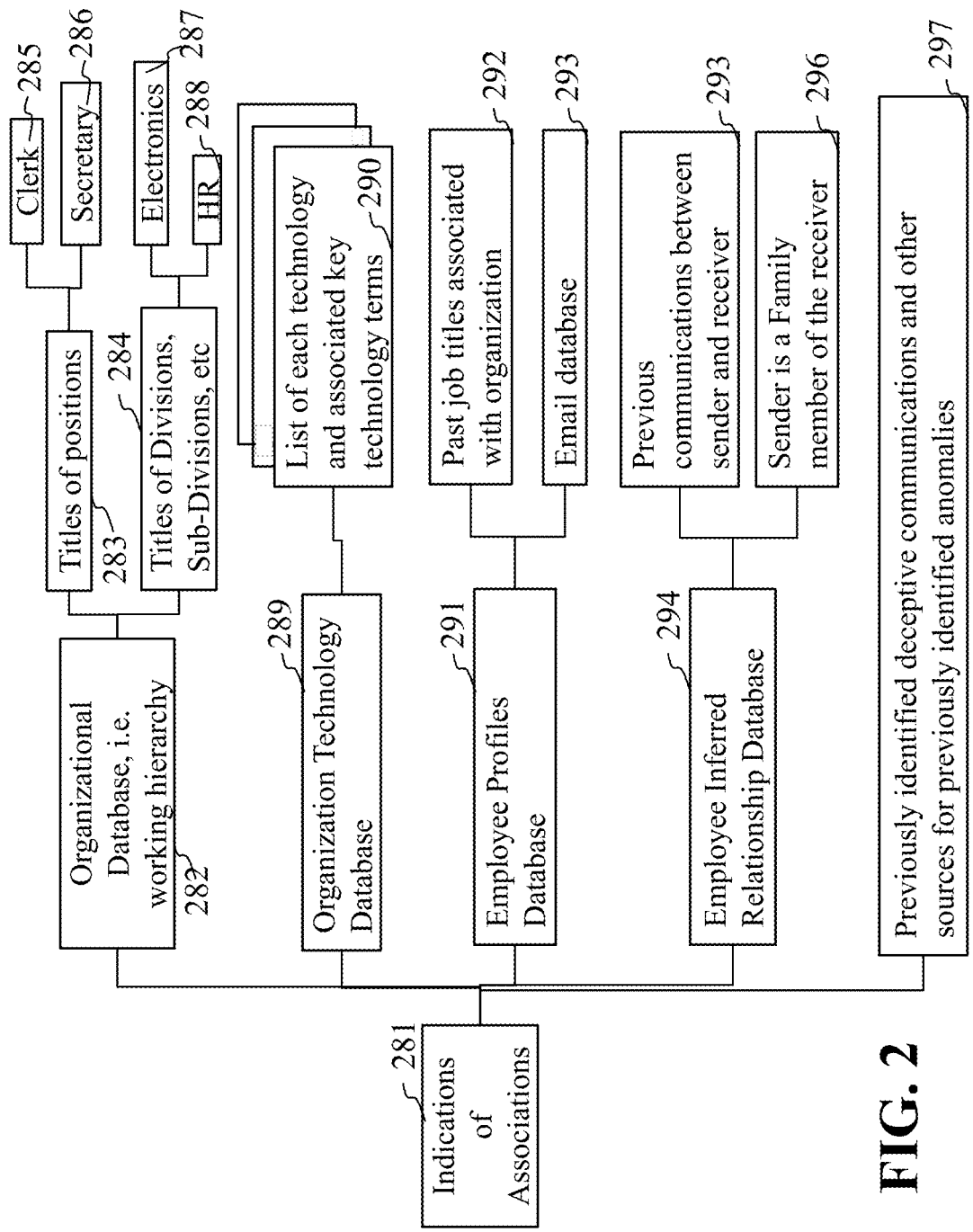
FIG. 2 is a schematic illustrating some indications of association between the sender and receiver, according to embodiments of the present disclosure.

FIG. 2 is a schematic illustrating some indications of association between the sender and the receiver correlating to the content of electronic communications between the sender and the receiver, according to embodiments of the present disclosure.

Some embodiments of the present disclosure improve email classification by using human relationship structures in a deep network classification task. Human relationship structures in the form of a graph, can include an association model between the sender and the receiver based on one or more indications of association 281 including: (a) a organizational chart database, i.e. working hierarchy 282 that includes a working hierarchy of employees within the organization; (b) an organization technology chart database 289, wherein each technology can include a set of predetermined searchable technology terms; (c) an employee organization database 291 for each employee of the organization which data for each employee may include work history such as past organizational positions held, education levels and attendance, etc., and an a email database 293 for each employee of the organization, that includes previous conversations between employees of the organization and non-employees outside of the organization; (e) an employee inferred relationship database 294 that can be determined based on a predetermined number of prior communications between the sender and the receiver based upon analysis of the employee email database 293.

Still referring to FIG. 2, the organizational chart database 282 can include titles of positions 283 within the organization, such as clerk 285 and secretary 286. Contemplated is any person paid or unpaid that is associated with the organization can be included in the organizational chart database 282.

The organizational technology chart database 289 can include lists of each technology 290, such that each technology can have associated searchable terms and phrases related to that technology. Still, the employee organizational database 291 can include employee related data such as past job titles 292 held by each employee, along with an email database of every conversation via electronic medium for each employee. Contemplated is that any information related to each employee obtainable by the organization can be included for each employee.

Still referring to FIG. 2, the employee inferred relationship database 294 can include data such as past number of previous communications between a sender and a receiver 295, along with data regarding electronic communication between a sender and a receiver that indicative of a family relationship 296.

The indications of association 281 can also include one or more databases of previously identified and confirmed email phishing received by a sender by the organization and other sources that have previously identified and confirmed email phishing 297.

Still referring to FIG. 2, according to some embodiments of the present disclosure, the indications of association between the sender and the receiver correlated to electronic communications between the sender and receiver can be used as inputs for one or more neural network(s) to detect the deceptiveness of the content in an incoming electronic communication. For example, data comprising the association model between sender and receiver can be used as inputs to one or more neural network(s) along with matching electronic communications to train those networks to detect the correlation between the association model and the content of the communications.

To better understand how indications of association may be used for detecting deception, one needs to better understand aspects of email phishing, which is further defined, along with some types and examples of email phishing. Per experimentation (see below), phishing emails are carefully crafted, such that if the receiver opens the email, the crafter of the email intends for the receiver not be wary or be without any suspicion. Some consequences of opening a phishing email is that upon opening the email, attackers gain access to enter into your system and access confidential data like bank account details, credit card numbers, social security number, passwords, etc. Once the information is obtained, the phishers immediately send or sell it to people who misuse them. Sometimes, phishing not only results in loss of information but also injects viruses into the victim's computer or phone. Once infected, phishers gain control over devices, through which they can send emails and messages to other people connected through the server.

Still referring to FIG. 2, there can be many different types of phishing, the types that can effect a receiver of incoming email and open the email can relate to a phishing called "Search Engine Phishing". This is a type of phishing that refers to a creation of a fake webpage for targeting specific keywords and waiting for the searcher to land on the fake webpage. Once a searcher clicks on the page link, he will never recognize that he is hooked until it is too late. Another type of phishng is "Spear Phishing". Unlike traditional phishing, which involves sending emails to millions of unknown users, spear phishing is typically targeted in nature, and the emails are carefully designed to target a particular user. These attacks have a greater risk because phishers do a complete social profile research about the user and their organization, through their social media profiles and company websites. Still another types of phishing is "Whaling", which is not very different from spear phishing, but the targeted group becomes more specific and confined in this type of phishing attack. This technique targets senior management positions, who are considered to be top players in the information chain of the organization, known also as "whales" in phishing terms. Large organizations with a large number of employees and are higher dependent on data are focused targets for phishing scammers.

Also, there are different types of phishing attacks, where scammers use Social Engineering to know the online behavior and preferences of their next potential victim, which helps them to craft sophisticated attacks. A first example of a phishing attack is called "Email Spoofing, i.e. Name Impersonation". Email spoofing is one of the easiest types of phishing used to get data from users without their knowledge. It can be done in different ways, for example, by sending an email through a familiar username, or sending an email impersonating your superiors of an organization and asking for some important data, or worse, impersonating the identity of an organization and asking employees to share internal data. An example, can be what appears to be an email sent from the Human Resource Dept. (HR) of the organization, requesting the employee to open a document in what appears to be the HR webpage, i.e. the scammer also showed a fraudulently signed email by the HR Dept., upon opening the document. Such a fraudulent email by a scammer that is well crafted with these types of details has a higher chance of being opened by the receiver and being phished. Some other types of phishing attacks relevant to the embodiments of the present disclosure can include Mass Target-brand Impersonations, URL Phishing, Subdomain Attacks, Website Spoofing and Clone Phishing, to name a few. Thus, based upon all the above problems email phishing can cause, the embodiments of the present disclosure are constructed to solve many of these problems through anomaly detection, i.e. confirmed types of indications of association between the sender and the receiver correlated to the content of communications between the sender and the receiver, in the incoming communication prior to the receiver opening the email and alerting the receiver of the potential danger.

Experimentation

Some aspects learned from experimentation is that email phishing is a big business for scammers and a substantial financial problem for individuals and corporate identities around the world. Phishing is a venue for criminals to swindle receivers of the receiver's online identities by using deception to manipulate or con the receivers into divulging confidential financial information, personal information, i.e. passwords, date of birth, social security numbers, etc. The scammers use the receiver's personal identity information or financial account credentials for fraudulent purposes for financial gain. Other possible ways scammers deceive receivers is by luring the receivers to a phony website masked as one of the receiver's usual websites used for consumer purchasing, i.e. Amazon, Macy's, Home Depot, or the masking the receiver's organization/company website where the receiver delivers company passwords into sensitive materials/documents. Other scamming methods can include faking or masking as fake technical service personnel or service support personnel, to try and get the receiver to provide their personal information, of which, is based on deceit used in order to achieve the scammer's goal of stealing.

Because email is mostly used by today's communication methods, this communication medium is one of the most targeted by scammers using deceitful messaging. The reason email phishing is a growing market for scammers is that the scammers have multiple ways of masking their identity, e.g., the sender's address can be routed through an anonymous server or the sender can use multiple user names to distribute messages via anonymous channels. Also, the accessibility of the Internet through many public places such as airports and libraries can provide anonymity for scammers to practice their craft.

Figure 3A:
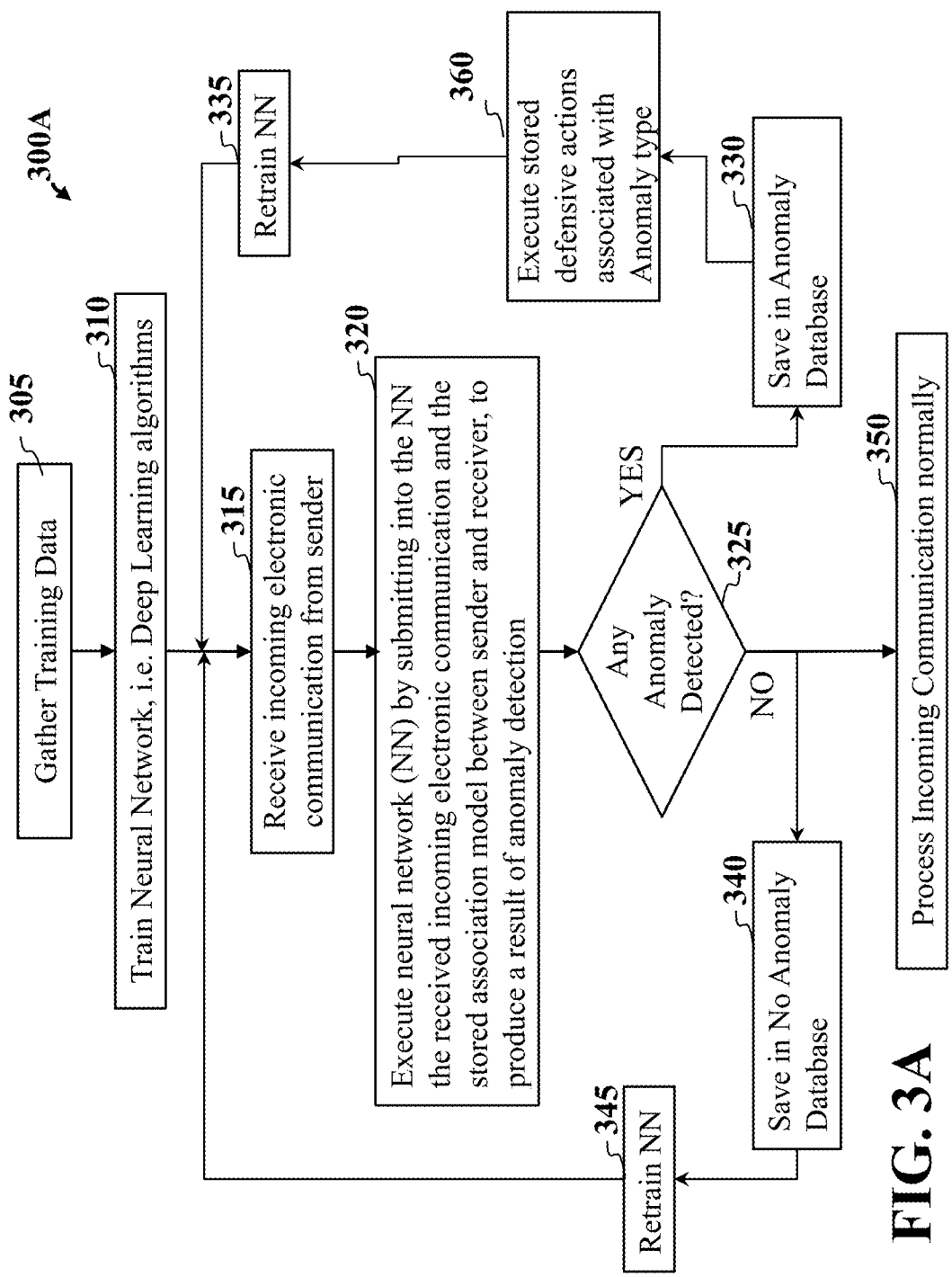
FIG. 3A is a flow diagram illustrating some computer system process flow steps for using classified text and deep learning algorithms to identify or detect anomalies in incoming electronic communication from a sender to a receiver and taking defensive actions such as providing early warning, sanitizing or not delivering the incoming communication, i.e. email, according to some embodiments of the present disclosure.

FIG. 3A is a flow diagram illustrating some computer system process flow steps for using classified text and deep learning algorithms to identify or detect anomalies in incoming electronic communication from a sender to a receiver and provide early warning, such as delivering or not delivering the incoming communication, i.e. email, according to some embodiments of the present disclosure. The detecting of anomalies is based on using a neural network(s) where training data sets having anomalies are mined for training by one or more deep learning algorithm.

Step 305 of FIG. 3A includes training data gathered based upon confirmed datasets with indications of association between the sender and the receiver stored for each communication, that have a sufficient amount of textual content. Stored communications that are anomalies also have an associated type of anomaly. These classifications (or categories or labels) of indications of association can be obtained from sources outside of the organization. The computer system data-mines these datasets to extract a sufficient number of datasets within a specific category to train the deep learning algorithms.

In terms of human relationship structure, for example, indications of association at the identify level and at the message level can be used as an indication of deception in electronic communications between the sender and the receiver, for instance, if the content of the communications correlates to a particular type of association between sender and receiver, but no indication of that association between the sender and the receiver is detected.

Indications of Association at the Identity-Level

Still referring to Step 305 of FIG. 3A, for example, indications of association at the identity-level, can include comparing the connections between the senders and receivers, such as relative place in a working hierarchy. Job titles and job descriptions disclosed in the incoming communication may be used to identify or help detect connections between the sender and the receiver. Some examples of phishing can be (a) senders posing as an employee such as a manager sending attachments in the incoming communication where the associated data is already accessible to the employee via organization network, and or embedded links in the incoming message that don't match the organization legitimate URLs; (b) (i) senders posing as a group of organization, such as technical support group requesting an unscheduled update for passwords and personal data; (ii) senders posing as a sister company of the organization, requesting access to the organization's sensitive secure information; (iii) senders posing as the organization's human resource department, for employees to click on a link provided and enter their sensitive information, i.e. credentials. Where the link directs the employee to a fake login page, and the employee provides their account name, password, social security number, etc., which is now compromised; (iv) senders posing as the organization's human resource department, for employees to confirm their new salary notification by entering sensitive data via a link directing them to a fake login page; (v) senders posing as top management of the organization requesting employees to download attachments or go to a link that is a fake login page.

Indications of Association at the Message-Level

Indications of association at the message-level can include key words associated with connections between the sender and receiver, such as: (a) shared organizational technologies, such as same technology terms, phrases or references; (b) key words or terms occurring in related employee profiles such as prior email conversations, past job titles and description, organizational committees, groups, task forces, special projects, etc.; (c) words correlated to employee inferred relationships such as family member, i.e. last names, sibling names, etc., number of email conversations; (d) previous organizational identified deceptive text content, other previous identified deceptive text content obtained outside of the organization.

Still referring to Step 305 of FIG. 3A, there can be other sources of training data, i.e. internal organizational sources of specific confirmed anomaly detection, i.e. specific types training data. Some examples are: textual data from the previous confirmed anomalies specific to each type of an enterprise (Organizational database, working hierarchy; Organizational technology database; Employee profiles database; Employee inferred Relationship database, etc.); and data from a confirmation by a receiver and by a certified company anomaly detector, that a specific text in the incoming communication has been scored by the neural network, deep learning algorithm(s), in a way indicating that it should be saved and used for re-training the neural network.

The data mining needed to create a strong deep learning algorithm aims at surfacing a factual anomalies of several types; for each type a correlation between different indications of association between the sender and the receiver and different features of the electronic communications will be learned.

In one or more embodiments, the computer system's primary, but not only, source of training data consists of electronic communications between a sender and receiver and indications of association at the identity-level and at the messaging-level and the organization level. The anomalies the system of the present invention would seek to surface in the test data are those where the indications of association present between the sender and receiver are not well correlated to the content of the electronic communication. The degree of the correlation detected is reported by a predetermined accuracy score, i.e. by non-limiting example, ranging from 0.00 to a maximum of 1.0. The training data can also includes positive training data, such as text that is known to be uncorrelated to the indications of association, or communications that are known to be anomalous in the context of an association model. and thus are likely to be an anomaly. The system can use the negative training data to better score test data as associated with a particular anomaly type.

Still referring to Step 305 of FIG. 3A, the training data is crucial for a deep learning engine to be able to produce an accuracy score for the text in the test data, which typically consists primarily of emails, i.e. incoming communication. The algorithm can produce an accuracy score by comparing the text in the email, as encoded, to a vector space described by a positive training data related to the indications of association between the sender and the receiver, and to the negative training data, where the indications of association do not match the text. Realized from experimentation is the need to ensure the training data was effective in training the neural network, i.e. the deep learning algorithms, for the embodiments of the present disclosure to be useful and robust.

Step 310 of FIG. 3A includes the process of aggregating this training material and providing it to a deep learning engine that involves creating a "vector" for each word or word sequence in the block in relation to the two or three words before and after it. Accordingly, each word vector has its own context, and that context is meaningful in connection with the type of similarity for which the deep learning algorithm is being trained. Transforming the text used in a specific classification (or, for similarity detection or anomaly detection) into numerical vectors may be accomplished via various methods such as Bag of words, Word2vec GloVe: Global Vectors for Word Representation, TF-IDF, LDA, etc.

Even though the deep learning algorithm will encode the text as noted above, i.e. words within the context of other words, the similarities or anomalies are not provided to the algorithm word by word, sentence by sentence, or paragraph by paragraph. Instead, the whole block of incoming text, i.e. text in the email, is presented for ingestion.

Still referring to step 310 of FIG. 3A, some aspects for obtaining many training data sets is to train a deep learning algorithm so that it functions well, and so it is considered "robust." The training data inputted into the neural network, i.e. deep learning algorithms, works well with natural language processing. Some embodiments of the present disclosure can use deep learning algorithms such as Recurrent Neural Networks with Long Short-Term Memory. These deep learning Recurrent Neural Networks use hidden computational nodes and various gates, and require tuning, i.e. manipulation. Also, the deep learning algorithms can be trained with one or more datasets unrelated to the detecting anomalies.

After the process of tuning, the algorithm is reviewed to see if the neural network is trained to accurately identify the anomalies of the training data sets, since the neural network is initialized before training to a random state. It is common for many different neural network models to be tested with a set of training data—typically the accuracy after training can vary greatly from model to model. When an algorithm is trained to "understand" a particular type of anomaly, it may be thought of as a "filter." Typically, the system will consist of more than one filter. The system passes the communications and association model through each filter, such that the deep learning algorithm is trained to identify anomalies, i.e. filter the incoming data to select only anomalous examples.

Step 315 of FIG. 3A includes receiving incoming electronic communication from the sender, once the neural network is trained. The computer system can index the incoming electronic communication, and extract text from the indexing, or extract text directly from incoming electronic communication, i.e. email and in any attachments. The process of what is extracted and when, and how stored can all depend on each organizations specific protocols or planning procedures and policies. For some embodiments of the present disclosure, the computer system operates in real-time to receive the incoming communication, i.e. unprocessed data, index the incoming communication, and store in the memory.

Step 320 of FIG. 3A includes the computer system accessing the stored unprocessed data, (i.e. the internal email data of the organization's incoming communication), or the indexed data, extract text into individual filters, where each filter is specific to a category-specific algorithm. Once the text is stored in each filter associated database, the filter then scores the filter text data for each email for accuracy in comparison to how each filter was trained. After each email is scored for accuracy in relation to the anomalies by the filters, the score and text are outputted, as anomaly detection or no anomaly detection, i.e. detected correlations meeting a predetermined threshold. In other words, the neural network (NN) is initiated by submitting into the NN the received incoming electronic communication and the association model, to produce a result of anomaly detection (true positive) or no anomaly detection (false positive), i.e. detected correlations meeting a predetermined correlations threshold. Note, an amount of all filtered text for all the filters, is less than an amount of the received unprocessed data, such that the filtering of the unprocessed data reduces the amount of data. When there is more than one type of anomaly, the anomaly detection result includes the type of anomaly best matching the detected anomaly.

Step 325 of FIG. 3A receives the output from the neural network and decides if an anomaly is detected.

Step 340 of FIG. 3A accepts, if no anomaly is detected, which translates into an amount of correlations were detected above a predetermined correlations threshold, wherein the no anomaly detected is saved into a No Anomaly database.

Step 345 of FIG. 3A receives the no anomaly detected information and then retrains the neural network, to update the neural network.

Step 350 of FIG. 3A accepts the no anomaly detection and processes the email according to the normal operation of the email delivery system, e.g. delivers the incoming email to the receiver.

Step 330 of FIG. 3A, however, accepts that an anomaly was detected (true positive) and saves the detected anomaly into an Anomaly Database.

Step 360 of FIG. 3A takes a sequence of defensive actions associated with the type of the detected anomaly. These defensive actions the organization may take based upon detecting an anomaly may include sanitizing or quarantining the email, alerting some or all employees of the organization of the hostile attack, along with other preventative measures. Contemplated is that each organization can have a multitude of actions upon the detection of each type of anomaly, which can be specific to each organization's security procedures and policies.

Step 335 of FIG. 3A accepts that an anomaly was detected and then retrains the neural network, to update the neural network.

Figure 3B:
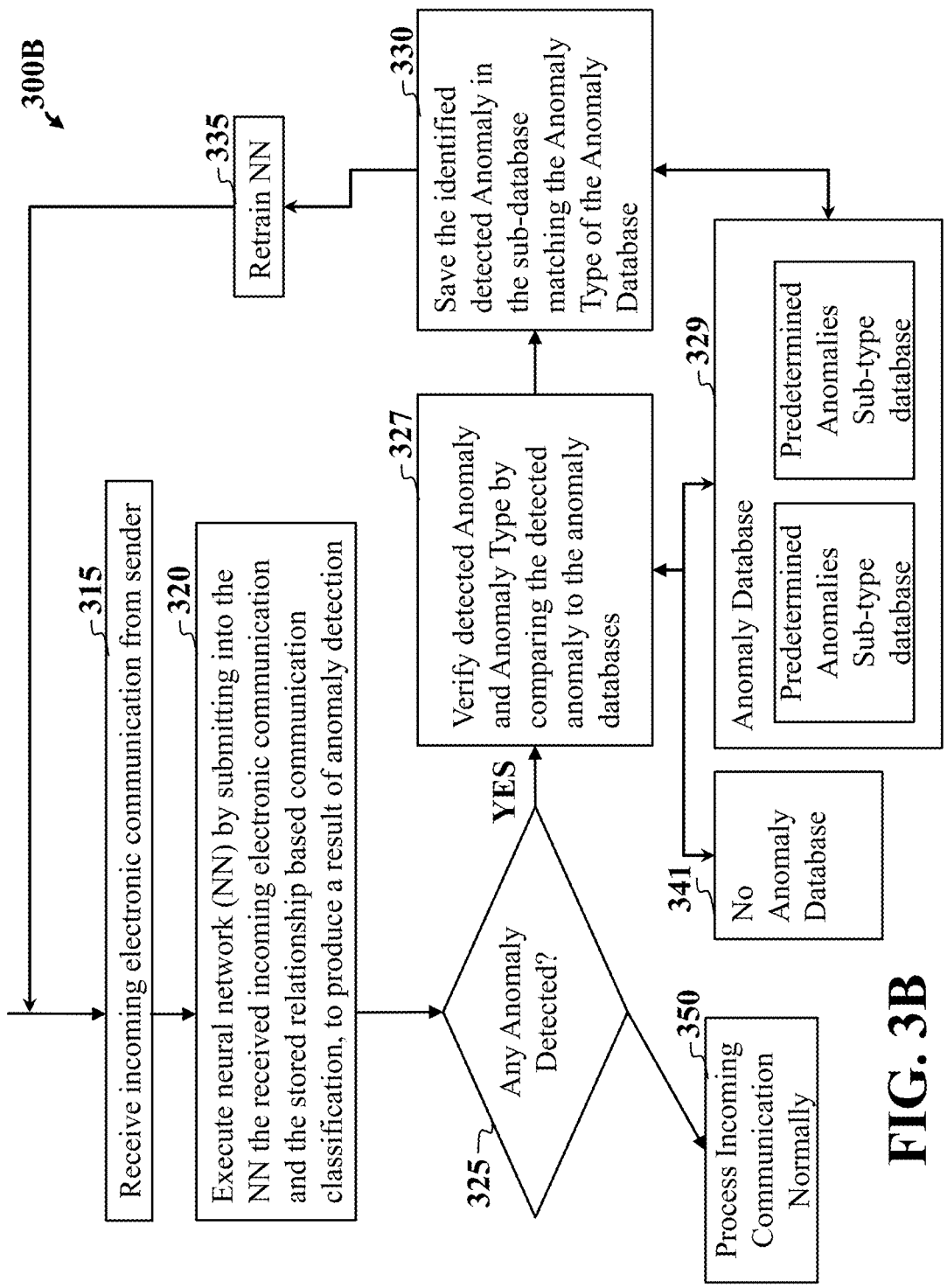
FIG. 3B is a variation of the flow diagram shown in FIG. 3A, illustrating how the result of anomaly detection may additionally be verified according to stored examples of anomaly and no anomaly data, according to some embodiments of the present disclosure.

FIG. 3B is a variation of the flow diagram shown in FIG. 3A, illustrating how the result of anomaly detection may additionally be verified according to stored examples of anomaly and no anomaly data, according to some embodiments of the present disclosure.

Block 340 of FIG. 3B is the No Anomaly database wherein examples of data that does not contain anomalies is stored.

Block 329 of FIG. 3B is the Anomaly Database wherein data containing anomalies is stored. The Anomaly Database may contain separate sub-type databases for each type of anomaly, or these may be stored together such that each anomaly example is stored with attached metadata indicating the type of anomaly.

Step 327 of FIG. 3B. accepts a detected anomaly. The detected anomaly is subjected to further verification by comparing it to similar examples in the Anomaly Database 329 and in the No Anomaly Database 340. Heuristic comparison may be performed based on similarities between features of the anomaly communication text and association model, or a trained classifier may be used. If the verification step decides that the detected anomaly best matches the No Anomaly examples, then it is not an anomaly but a "false positive", and the example is stored to the No Anomaly Database 340 with metadata indicating that it was a false positive and with the original anomaly detection result so that it may be used for re-training and/or hand-labeled. If the verification step decides that the anomaly is correctly marked as an anomaly then it is a "true positive". A true positive anomaly is saved to the Anomaly Database 329. If the detected anomaly type does not matches the type output by the verification step, then the anomaly is saved to the No Anomaly Database in the verified sub-type database or with metadata matching the verified anomaly type, but with metadata indicating the original result of anomaly detection so that it may be used for re-training and/or hand-labeled.

Figure 4:
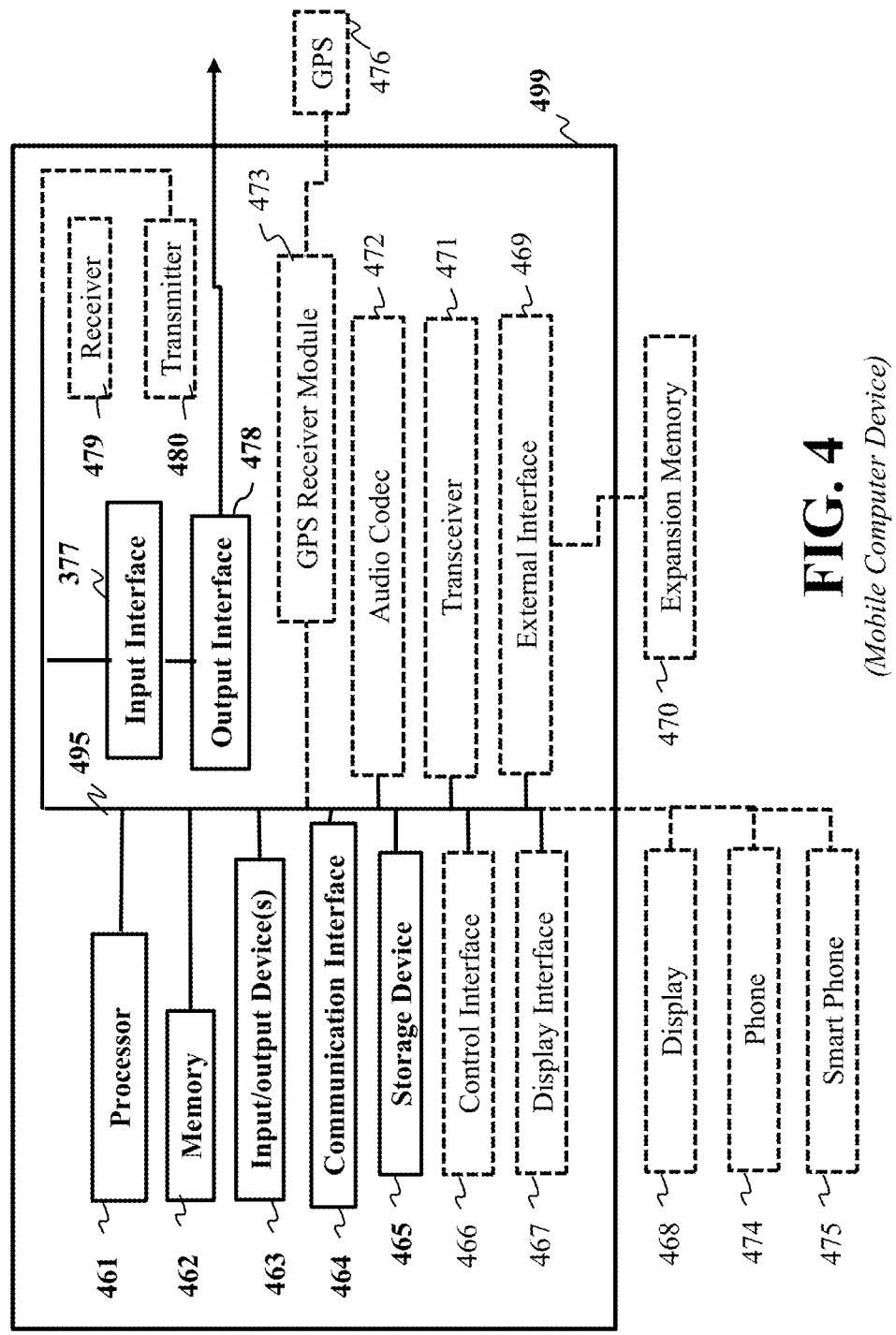
FIG. 4 is a schematic illustrating a mobile computing apparatus that can be used with the communication system to implement some techniques of the methods and systems, according to embodiments of the present disclosure.

FIG. 4 is a schematic illustrating a mobile computing apparatus that can be used with the communication system to implement some techniques of the methods and systems, according to embodiments of the present disclosure. The mobile computing device 400 includes a bus 495 connecting a processor 461, a memory 462, an input/output device 463, a communication interface 464, among other components. The bus 495 can also be connected to a storage device 465, such as a micro-drive or other device, to provide additional storage.

The processor 461 can execute instructions within the mobile computing device 400, including instructions stored in the memory 462. The processor 461 may be implemented as a chipset of chips that include separate and multiple analog and digital processors. The processor 461 may provide, for example, for coordination of the other components of the mobile computing device 400, such as control of user interfaces, applications run by the mobile computing device 400, and wireless communication by the mobile computing device 400. Contemplated are various component configurations that may be mounted on a common motherboard, by non-limiting example, 499, depending upon the specific application.

The processor 461 may communicate with a user through a control interface 466 and a display interface 467 coupled to the display 468. The display 468 may be, for example, a TFT (Thin-Film-Transistor Liquid Crystal Display) display or an OLED (Organic Light Emitting Diode) display, or other appropriate display technology. The display interface 467 may comprise appropriate circuitry for driving the display 468 to present graphical and other information to a user. The control interface 466 may receive commands from a user and convert them for submission to the processor 461. In addition, an external interface 469 may provide communication with the processor 461, so as to enable near area communication of the mobile computing device 400 with other devices. The external interface 469 may provide, for example, for wired communication in some implementations, or for wireless communication in other implementations, and multiple interfaces may also be used.

Still referring to FIG. 4, the memory 462 stores information within the mobile computing device 400. The memory 462 can be implemented as one or more of a computer-readable medium or media, a volatile memory unit or units, or a non-volatile memory unit or units. An expansion memory 470 may also be provided and connected to the mobile computing device 499 through an expansion interface 469, which may include, for example, a SIMM (single in line memory module) card interface. The expansion memory 470 may provide extra storage space for the mobile computing device 499, or may also store applications or other information for the mobile computing device 499. Specifically, the expansion memory 470 may include instructions to carry out or supplement the processes described above, and may include secure information also. Thus, for example, the expansion memory 470 may be providing as a security module for the mobile computing device 499, and may be programmed with instructions that permit secure use of the mobile computing device 400. In addition, secure applications may be provided via the SIMM cards, along with additional information, such as placing identifying information on the SIMM card in a non-hackable manner.

The memory 462 may include, for example, flash memory and/or NVRAM memory (non-volatile random-access memory), as discussed below. In some implementations, instructions are stored in an information carrier, that the instructions, when executed by one or more processing devices (for example, processor 400), perform one or more methods, such as those described above. The instructions can also be stored by one or more storage devices, such as one or more computer or machine-readable mediums (for example, the memory 462, the expansion memory 470, or memory on the processor 462). In some implementations, the instructions can be received in a propagated signal, for example, over the transceiver 471 or the external interface 469.

Still referring to FIG. 4, the mobile computing apparatus or device 400 of FIG. 4 is intended to represent various forms of mobile devices, such as personal digital assistants, cellular telephones, smart-phones, and other similar computing devices. The mobile computing device 400 may communicate wirelessly through the communication interface 464, which may include digital signal processing circuitry where necessary. The communication interface 464 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 471 using a radio-frequency. In addition, short-range communication may occur, such as using a Bluetooth, Wi-Fi, or other such transceiver (not shown). In addition, a GPS (Global Positioning System) receiver module 473 may provide additional navigation and location related wireless data to the mobile computing device 400, which may be used as appropriate by applications running on the mobile computing device 400.

The mobile computing device 400 may also communicate audibly using an audio codec 472, which may receive spoken information from a user and convert it to usable digital information. The audio codec 472 may likewise generate audible sound for a user, such as through a speaker, e.g., in a handset of the mobile computing device 400. Such sound may include sound from voice telephone calls, may include recorded sound (e.g., voice messages, music files, etc.) and may also include sound generated by applications operating on the mobile computing device 499.

Still referring to FIG. 4, the mobile computing device 400 may be implemented in a number of different forms, as shown in the figure. For example, it may be implemented as a cellular telephone 474. It may also be implemented as part of a smart-phone 475, personal digital assistant, or other similar mobile device. Also, an input interface 477, output interface 478, a receiver 479 and transmitter 480 can be included in the mobile computing device 400.

Features

The following aspects are intended to either individually or in combination, create one or more embodiments based on the one or more combination of aspects listed below, for the above recited systems and methods in the Features Section.

An aspect can include that the received incoming electronic communication is processed into classified text and used with the neural network that includes deep learning algorithms to detect the anomalies. The processor is configured to create training datasets for textual data corresponding to the trained association model having detected the relationship based communication classification, and train the deep learning algorithms using the one or more training datasets. Extract electronic communications related to an organization, and apply the deep learning algorithms to the electronic communications to identify and report, the detected anomaly. Determine if the detected anomaly is a true positive or a false positive. If the detected anomaly is the true positive indicating a hostile intent, then identify if the detected anomaly is predetermined as deliverable or predetermined as non-deliverable. Then, save the electronic communications in a true positive database according to a predetermine deliverable sub-database for identified deliverable anomalies. Or, a predetermined non-deliverable sub-database for identified non-deliverable anomalies, and re-train the deep learning algorithms. Or, if the detected anomaly is the false positive indicating the no anomaly detected, then save the electronic communications in a false positive database, and re-train the deep learning algorithms. Deliver the incoming electronic communication to the receiver when the false positive is detected which indicates no anomaly is detected and when the detected anomaly is identified as deliverable.

An aspect can include that each deep learning algorithm is trained with a different relationship based communication classifier of the trained association model, such that the relationship-based communication classification includes a similarities detected at an identity-level classification or a similarities detected at a message-level classification, wherein a deep learning algorithm is associated with the similarities detected at an identity-level classification and trained using previously relationship based communication classified data, associated with previous similarities detected at an identity-level training between the sender and the receiver, and another deep learning algorithm is associated with the similarities detected at message-level classification and trained using previously relationship based communication classified data, associated with previous similarities detected at the message-level between the sender and the receiver. Wherein an aspect is that the similarities detected at the identity-level is based on indications of text associated with similarities between the sender and receiver, such as similarities within an organizational structure including a working hierarchy. Further, an aspect is wherein the working hierarchy includes text associated with: (a) an executive title of an employee in combination with an attached attachment, and names of accessible data to employees within the organization; (b) an executive title of an employee in combination with URL's not matching the organization list of legitimate URLs; (c) one or more group names within the organization, including technical support group in combination with an update for passwords, or personal data; (d) one or more sister company of the organization in combination with one or more names of sensitive secure organization information; (e) human resource in combination with one or more links and names of sensitive information of the organization. Further still, an aspect is that wherein the similarities detected at the message-level is based on indications of text associated with similarities between the sender and receiver, such as similarities within: (a) organizational technologies; (b) employee profiles including one of prior job titles, organizational committee names, organizational group names, organizational task force names, special project names; (c) employee inferred relationships including a sender having a same last name as the receiver in combination with employee profiles.

An aspect is that the neural network includes one or more deep learning algorithm, such that the one or more deep learning algorithm is trained with the trained association model using relationship based communication classified data sourced to be a model for hostile requests associated with the anomaly detection. Still an aspect is that each detected deliverable anomaly corresponds to one or more predetermined command actions to be implemented by the processor. Contemplated is an aspect that the trained association model is generated by processing the human relationship structure as encoded in a graph or a database that contains relationship of persons and organizational sub-units within an organization such as a business.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. The details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non-transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the intention of the appended claims to cover all such variations and modifications as come within the true spirit and scope of the present disclosure.

What is claimed is:

1. A computer system for detecting anomalies in an incoming electronic communication from a sender to a receiver, comprising:
　　an input interface configured to accept a human relationship structure defining a trained association model between the sender and the receiver, and the incoming electronic communication;
　　a memory configured to store one or more neural networks trained to detect anomalies in the incoming electronic communication and classify the anomalies by type, subject to correspondence between content of the incoming electronic communication and the trained association model between the sender and the receiver; and
　　a processor configured to:
　　　　compute an updated association model between the sender and the receiver, based on organizational indications of the sender and the receiver using the content of the incoming electronic communication;
　　　　execute the one or more neural networks by submitting to the one or more neural networks the incoming electronic communication and the updated association model to produce a result of at least one anomaly detection and anomaly classification type;

combine sets of defensive actions associated with the at least one anomaly detection into a single sequence of defensive actions; and execute the single sequence of defensive actions to deliver the incoming electronic communication to the receiver, based on the single sequence of defensive actions being above a predetermined delivering threshold.

2. The computer system of claim 1, wherein the incoming electronic communication is processed into classified text and used with the one or more neural networks that include deep learning algorithms, and wherein the processor is configured to:

create one or more training datasets for textual data corresponding to the trained association model having detected a relationship based communication classification, and train the deep learning algorithms using the one or more training datasets;

extract electronic communications related to an organization, and apply the deep learning algorithms to the extracted electronic communications to identify and report at least one anomaly;

determine if the at least one anomaly is a true positive or a false positive, and if the at least one anomaly is the true positive indicating a hostile intent, then identify if the at least one anomaly is predetermined as deliverable or predetermined as non-deliverable, then save the extracted electronic communications in a true positive database according to a predetermine deliverable sub-database for identified deliverable anomalies or a predetermined non-deliverable sub-database for identified non-deliverable anomalies, and re-train the deep learning algorithms, or if the detected anomaly is the false positive indicating no anomaly detected, then save the electronic communications in a false positive database, and re-train the deep learning algorithms; and deliver the incoming electronic communication to the receiver when the false positive is detected which indicates no anomaly is detected and when the detected anomaly is identified as deliverable.

3. The computer system of claim 2, wherein each of the deep learning algorithms is trained with a different relationship based communication classifier of the trained association model, such that the relationship based communication classification includes a similarities detected at an identity-level classification or a similarities detected at a message-level classification, wherein a deep learning algorithm of the deep learning algorithms is associated with the similarities detected at an identity-level classification and trained using previously relationship based communication classified data, associated with previous similarities detected at an identity-level training between the sender and the receiver, and another deep learning algorithm of the deep learning algorithms is associated with the similarities detected at message-level classification and trained using previously relationship based communication classified data, associated with previous similarities detected at the message-level between the sender and the receiver.

4. The computer system of claim 3, wherein the similarities detected at the identity-level is based on indications of text associated with similarities between the sender and receiver within an organizational structure including a working hierarchy.

5. The computer system of claim 4, wherein the working hierarchy includes text associated with: (a) an executive title of an employee in combination with an attached attachment, and names of accessible data to employees within the organization; (b) an executive title of an employee in combination with URL's not matching the organization list of legitimate URLs; (c) one or more group names within the organization, including technical support group in combination with an update for passwords, or personal data; (d) one or more sister company of the organization in combination with one or more names of sensitive secure organization information; (e) human resource in combination with one or more links and names of sensitive information of the organization.

6. The computer system of claim 3, wherein the similarities detected at the message-level is based on indications of text associated with similarities between the sender and receiver within one or more of: (a) organizational technologies; (b) employee profiles including one of prior job titles, organizational committee names, organizational group names, organizational task force names, special project names; (c) employee inferred relationships including a sender having a same last name as the receiver in combination with employee profiles.

7. The computer system of claim 1, wherein the one or more neural networks include one or more deep learning algorithms, such that the one or more deep learning algorithms are trained with the trained association model using relationship based communication classified data sourced to be a model for hostile requests associated with the anomaly detection.

8. The computer system of claim 2, wherein each of the at least one deliverable anomaly corresponds to one or more predetermined command actions to be implemented by the processor.

9. The computer system of claim 1, wherein the trained association model is generated by processing the human relationship structure as encoded in a graph or a database that contains relationship of persons and organizational sub-units within an organization.

10. A method for detecting anomalies in an incoming electronic communication from a sender to a receiver, comprising:

receiving a human relationship structure defining a trained association model between the sender and the receiver, and the incoming electronic communication;

accessing a memory having stored data, the stored data includes one or more neural networks trained to detect anomalies in the incoming electronic communication and classify the anomalies by type, subject to correspondence between content of the incoming electronic communication and the trained association model between the sender and the receiver;

computing an updated association model between the sender and the receiver, based on organizational indications of the sender and the receiver using the content of the incoming electronic communication;

executing the one or more neural networks by submitting to the one or more neural networks the incoming electronic communication and the updated association model to produce a result of at least one anomaly detection and anomaly classification type, and then, combining sets of defensive actions associated with the at least one anomaly detection into a single sequence of defensive actions; and execute the single sequence of defensive actions to deliver the incoming electronic communication to the receiver, based on the single sequence of defensive actions being above a predetermined delivering threshold.

11. The method of claim 10, wherein the incoming electronic communication is processed into classified text and used with the one or more neural networks including deep learning algorithms, the method further comprising:
creating one or more training datasets for textual data corresponding to the trained association model having detected a relationship based communication classification, and train the deep learning algorithms using the one or more training datasets;
extracting electronic communications related to an organization, and applying the deep learning algorithms to the extracted electronic communications to identify and report at least one anomaly;
determining if the at least one anomaly is a true positive or a false positive, and if the at least one anomaly is the true positive indicating a hostile intent, then save the extracted electronic communications in a true positive database, and re-train the deep learning algorithms, or if the detected anomaly is the false positive indicating no anomaly detected, then save the electronic communications in a false positive database, and re-train the deep learning algorithms; and
deliver the incoming electronic communication to the receiver when the false positive is detected which indicates no anomaly is detected.

12. The method of claim 11, wherein each of the deep learning algorithm is trained with a different relationship based communication classifier of the trained association model, such that the relationship based communication classification includes a similarities detected at an identity-level classification or a similarities detected at a message-level classification, wherein a deep learning algorithm of the deep learning algorithms is associated with the similarities detected at an identity-level classification and trained using previously relationship based communication classified data, associated with previous similarities detected at an identity-level training between the sender and the receiver, and another deep learning algorithm of the deep learning algorithms is associated with the similarities detected at message-level classification and trained using previously relationship based communication classified data, associated with previous similarities detected at the message-level between the sender and the receiver.

13. The method of claim 11, further comprising:
indexing the incoming electronic communication;
scoring via each deep learning algorithm of the deep learning algorithms, the indexed data for accuracy with the deep learning algorithm associated the relationship based communication classification of the trained association model between the sender and the receiver of the indexed data, such that the at least one anomaly includes the scores and related data that is stored in a detected anomaly database based upon scores that are above a predetermined anomaly score threshold.

14. A non-transitory computer readable storage medium having embodied thereon a program executable by a processor for performing a method for detecting anomalies in an incoming communication from a sender to a receiver, the method comprising:
receiving a relationship structure defining a trained association model between the sender and the receiver and the incoming communication;
accessing a memory having stored data, the stored data includes one or more neural networks trained to detect anomalies in the incoming communication and classify the anomalies by type, subject to correspondence between content of the incoming communication and the trained association model;
computing an updated association model, based on organizational indications of the sender and the receiver using the content of the incoming communication;
executing the one or more neural networks by submitting to the one or more neural networks the incoming communication and the updated association model to produce a result of at least one anomaly detection and anomaly classification type, and then, combining sets of defensive actions associated with the at least one anomaly detection into a single sequence of defensive actions; and
execute the single sequence of defensive actions to deliver the incoming communication to the receiver, based on the single sequence of defensive actions being above a predetermined delivering threshold.

15. The non-transitory computer readable storage medium of claim 14,
wherein the incoming communication is processed into classified text and used with the one or more neural networks that include deep learning algorithms, and wherein the method further comprises:
creating one or more training datasets for textual data corresponding to the trained association model having detected a relationship based communication classification, and train the deep learning algorithms using the one or more training datasets;
extracting electronic communications related to an organization, and apply the deep learning algorithms to the extracted electronic communications to identify and report at least one anomaly;
determining if the at least one anomaly is a true positive or a false positive, and if the at least one anomaly is the true positive indicating a hostile intent, then identify if the at least one anomaly is predetermined as deliverable or predetermined as non-deliverable, then save the extracted electronic communications in a true positive database according to a predetermine deliverable sub-database for identified deliverable anomalies or a predetermined non-deliverable sub-database for identified non-deliverable anomalies, and re-train the deep learning algorithms, or if the detected anomaly is the false positive indicating no anomaly detected, then save the electronic communications in a false positive database, and re-train the deep learning algorithms; and
delivering the incoming electronic communication to the receiver when the false positive is detected which indicates no anomaly is detected and when the detected anomaly is identified as deliverable, and
wherein each of the at least one deliverable anomaly corresponds to one or more predetermined command actions to be implemented by the processor.

16. The non-transitory computer readable storage medium of claim 14, wherein the trained association model is generated by processing the relationship structure as encoded in a graph or a database that contains relationship of persons and organizational sub-units within an organization.

17. The non-transitory computer readable storage medium of claim 14, wherein the incoming communication is processed into classified text and used with the one or more neural networks that include deep learning algorithms, wherein the method further comprises:
creating one or more training datasets for textual data corresponding to the trained association model having detected a relationship based communication classification, and train the deep learning algorithms using the one or more training datasets;

extracting communications related to an organization, and applying the deep learning algorithms to the extracted communications to identify and report at least one anomaly;

determining if the at least one anomaly is a true positive or a false positive, and if the at least one anomaly is the true positive indicating a hostile intent, then save the electronic communications in a true positive database, and re-train the deep learning algorithms, or if the detected anomaly is the false positive indicating no anomaly detected, then save the electronic communications in a false positive database, and re-train the deep learning algorithms; and delivering the incoming communication to the receiver when the false positive is detected which indicates no anomaly is detected.

18. The non-transitory computer readable storage medium of claim 17, wherein the one or more neural networks include deep learning algorithms, such that each one of the deep learning algorithms is trained with one or more datasets associated with the trained association model having relationship based communication classifications between the sender and the receiver, wherein the trained association model includes a similarities at an identity-level classification and a similarities at a message-level classification.

* * * * *